United States Patent [19]

Wehr et al.

[11] Patent Number: 4,690,309

[45] Date of Patent: Sep. 1, 1987

[54] PORTABLE, SELF-POWERED, ADJUSTABLE HERBICIDE DISPENSING SYSTEM

[75] Inventors: Michael A. Wehr, Hancock; Robert L. Sajdak, Chassell, both of Mich.

[73] Assignee: The United States of America as represented by the Secretary of Agriculture, Washington, D.C.

[21] Appl. No.: 881,995

[22] Filed: Jul. 3, 1986

Related U.S. Application Data

[62] Division of Ser. No. 676,147, Nov. 29, 1984, Pat. No. 4,653,830.

[51] Int. Cl.[4] .......... G01F 11/06

[52] U.S. Cl. .......... 222/249; 222/250; 222/309; 222/335; 222/341; 222/389; 239/322

[58] Field of Search .......... 222/175, 249, 250, 309, 222/334, 335, 340, 341, 373, 380, 389, 400.7, 387, 253; 239/99, 321, 322

[56] References Cited

U.S. PATENT DOCUMENTS 1,764,823 6/1930 Bowlus .......... 222/335
2,789,396 4/1957 Jernander et al. .......... 222/175 X
2,814,422 11/1957 Mercier .......... 222/335
4,213,544 7/1980 Pandolfi .......... 222/250

*Primary Examiner*—Joseph J. Rolla
*Assistant Examiner*—Kevin P. Shaver
*Attorney, Agent, or Firm*—M. Howard Silverstein; David G. McConnell

[57] ABSTRACT

A self-powered spraying device for dispensing a metered amount or a continuous amount of chemical. A valve is connected through conduits to a cavity in front of a piston, to a cavity in the rear of the piston, to a fluid pressure source and to a nozzle. In the open position of the valve the rear cavity is connected to the fluid pressure source, and the front cavity to the nozzle. In the closed position of the valve the front and rear cavities are connected so that a spring within the front cavity drives the piston to the rear, thereby transferring chemical from the rear cavity to the front cavity. A second valve is also provided which in an opened position permits the metered dispensing of chemical when the first valve is operated and when in a closed position permits the continuous release of chemical when the first valve is operated.

2 Claims, 6 Drawing Figures

1
2
3
4
5
6
7
8
9
10
11
12
13
14
15
16
17
18
19
20
21
22
23
24
25
26
27
28
29
30
31
32
33
34
35
36
37
38
39
40
41
42
50
51
54
55
56
57
58

PORTABLE, SELF-POWERED, ADJUSTABLE HERBICIDE DISPENSING SYSTEM

This is a division of application Ser. No. 676,147 filed 11/29/84, now U.S. Pat. No. 4,653,830.

BACKGROUND OF THE INVENTION

This invention relates to an herbicide application system for use in managing vegetation in forests, ranges, rights-of-way, and industrial situations.

In the last three decades, herbicides have emerged as an important vegetation management tool. Nearly 1.5 million acres of commercial forest land are treated each year with herbicides. An even greater acreage is treated annually on range, highway and utility rights-of-way, and industrial lands. The use of herbicides is increasing as costs of alternative methods of vegetation control increase and as new, more effective compounds are developed.

Herbicides can be injected into, sprayed onto, or applied to the soil around individual trees. They can be broadcast over the tops of trees or from below, applied in narrow continuous bands, or spot-applied in a grid pattern. They can be applied from the air, from mechanized ground machines, or by a variety of hand-held equipment. Because of growing concern over the safety and cost-effective use of chemicals and with the development of new, highly specific compounds, interest has increased in the use of hand-held application equipment.

Treatment of vegetation by hand, utilizing a backpack sprayer, allows the operator to spot-treat only the necessary areas, thus saving on chemical costs and large equipment costs. In some situations, hand treatment is more environmentally acceptable. This method, however, has some drawbacks. The two common, commercially available units utilize the following operational principles: (1) Backpack tank with hand pump or compressed gas to charge the sprayer system. Activation of a wand discharges a steady stream of chemical. With this method, accurate dispensing of chemical to a given area is impossible. (2) Backpack tank with a hand pump wand. This system uses an adjustable stroke hand pump in the wand to discharge a predetermined amount of chemical. Operator fatique is the major disadvantage with this method. This invention uses some of the principles of currently available systems but incorporates them into a unique device so that the metered discharge is power assisted for ease of operation. Activation of the device discharges an adjustable but predetermined quantity of chemical. This allows the operator to accurately apply herbicides in a cost-effective manner according to the objectives of the vegetation management prescription for a particular area of land.

SUMMARY OF THE INVENTION

It is an object of the present invention to provide a self-powered spraying apparatus which sprays a predetermined amount of liquid.

It is another object of the present invention to provide a power-assisted spraying apparatus which may be modified, in some embodiments, to operate in either a continuous or metered mode.

It is a further object of this invention to provide a spraying device which alleviates the problem of operator fatique.

The invention contemplates the use of a single or combination unit, typically a backpack, which houses a chemical mix tank, hand pump, and/or high-pressure air tank. Feed lines from the tank are connected to the cylindrical hand wand in a manner as required by the system selection.

More specifically, in one embodiment, the invention contemplates the use of a unit which houses a chemical mix tank and high-pressure gas tank. Feed lines from each tank are connected to a cylindrical hand wand which houses a gas-operated piston pump. The stroke of the piston is preferably adjustable. Pushing a control button at the head of the wand allows gas pressure to build up on the back side of the piston. When fully pressurized the piston moves forward, forcing the chemical mix located on the front side of the piston out of the nozzle. Releasing the button relieves the pressure, allowing the piston to spring-return to its original starting position. During the return stroke, chemical is drawn into the forward chamber, readying the device for the next cycle.

Utilizing the tank with a hand pump system and only one tank, a single feed line from the high-pressure storage chamber within the tank is connected to the hand wand which houses a spring return piston pump. The stroke of the piston is adjustable. Pushing a control button at the head of the wand allows pressurized liquid to force the piston forward. The liquid in the front chamber is forced out of the nozzle. Releasing the control button stops the liquid flow and allows the piston to spring-return to its starting position. During the return stroke, the liquid in the rear chamber is transferred to the front chamber, readying the device for the next cycle. An optional control switch on the hand wand allows the operation to be converted to a conventional push-to-spray sequence. Pushing the control button with the control switch activated allows the liquid to spray continuously out of the nozzle. Releasing the button stops the spray.

When using the unit with the chemical mix tank with high-pressure air tank, the control button and switch cartridges may be removed, in some embodiments, and replaced with different control modules.

DETAILED DESCRIPTION OF THE INVENTION

Figures 1A, 1B, 1C:
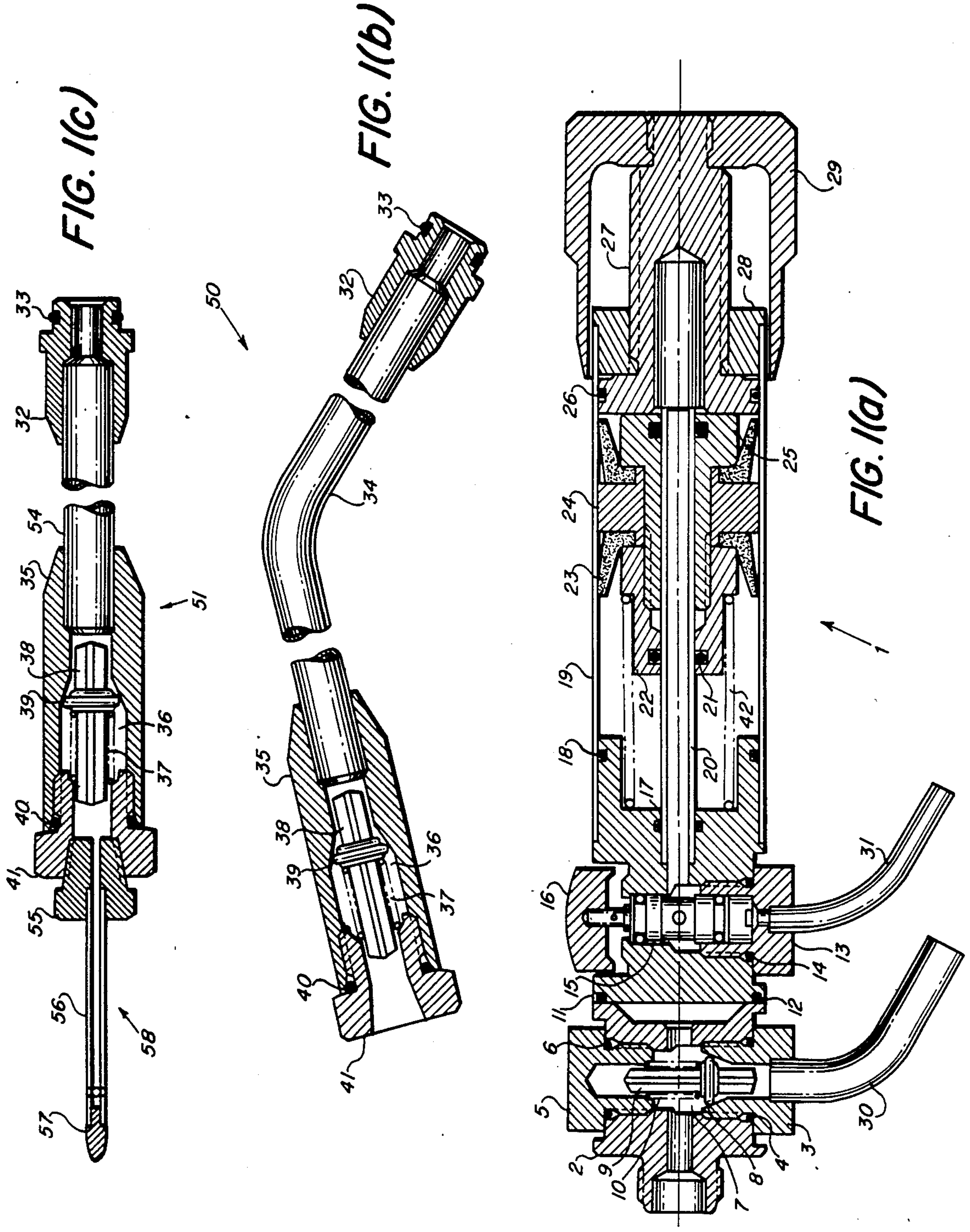
FIGS. 1(*a*)–1(*c*) show the hand wand and two nozzle types in sectional view.

FIGS. 1(*a*)–1(*c*) of the drawings disclose the hand wand dispensing device which is designated by the reference numeral 1. At the forward end of the wand is the liquid section comprised of the body 2, feed tube 30, check valve assembly 7, and upper and lower covers and seals, respectively, 5, 3, 6, and 4.

To the rear of the liquid section is the air section which is comprised of the body 11, seal 12, air valve 15, feed tube 31, activator button 16, lower cover 13, and seal 14. Attached to the air section are the air feed tube 20 and seal 17 and the outer body tube 19 and seal 18. Located in a chamber within the outer body tube is the slidably mounted piston, comprised of rod seal 21, bore seal 23, forward piston section 22, mid piston section 24, rear piston section 25, and return spring 42. The dispensing adjustment consists of the tube end fitting 28, hand knob 29, positioner 27, and seal 26. The nozzle assemblies 50 and 51 are attached to the front part of liquid section body 2 and consist of adapter 32; seal 33; and tubes 34, and 54, respectively; check valve housing 35; check valve assembly 36; closure plug 41; and seal 40. Different lengths of tube 34 are intended to be used with cone or solid stream spray tips. Nozzle assembly 51 has a straight tube section with special spray tip 58 for use in soil injection. It consists of adapter fitting 55, injection tube 56, and penetration tip 57.

Figure 2:
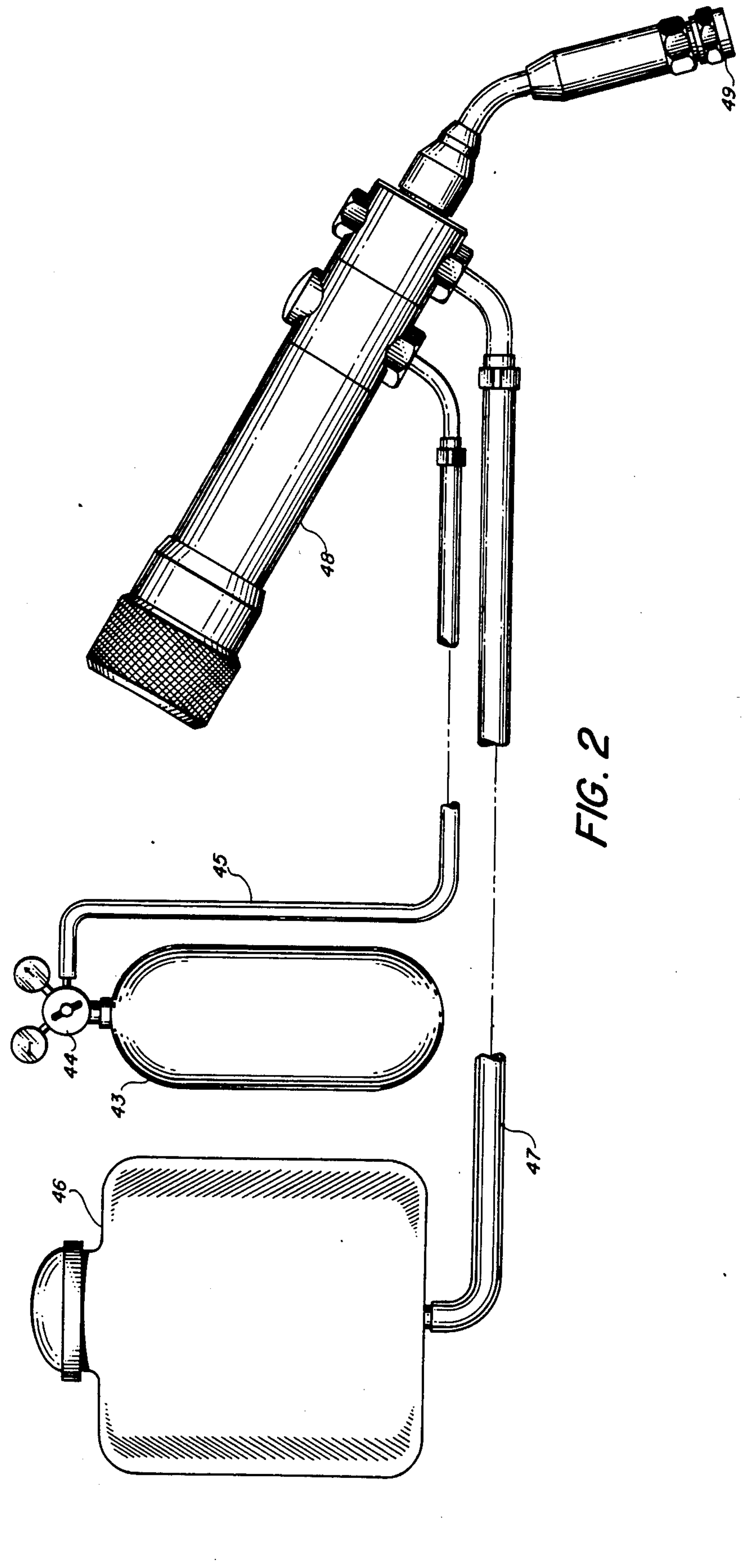
FIG. 2 shows the system schematically.

FIG. 2 of the drawings shows a spray system schematic consisting of the hand wand assembly 48, compressed gas reservoir 43, regulator 44, gas hose 45, liquid container 46, hose 47, and nozzle 49.

The spraying system functions in the following manner. When the activator button 16 is pushed, the normally closed air valve 15 opens and allows communication between reservoir 43 and the back side of rear piston section 25 allowing compressed air to travel from the reservoir 43 through the regulator 44, hose 45, feed tube 31, and into the valve. From the valve the air travels rearwards through the air feed tube 20 to the back side of the piston assembly. As the pressure increases and overcomes the force on the return spring 42, the piston advances, forcing the liquid contained in the cavity in front of the piston through the ports in the air section (not shown) into the liquid section. Check valve 7 diverts the liquid out the nose portion of the liquid section 2 and into nozzle assembly 50 or 51. Check valve 36 then unseals and allows the liquid to be discharged out of nozzle 49 using the spray pattern as selected by the operator. When the piston completes its full travel, liquid flow stops. The operator then releases the activator button which allows communication between the back side of the piston and the atmosphere, i.e. it stops the air flow and releases the air from the back side of the piston thus providing a pressure release. Seat 39 of check valve 36 seats and seat 8 of check valve 7 unseats as the spring forces the piston back to its starting position, drawing in the next charge of mix into the liquid section.

Figure 3:
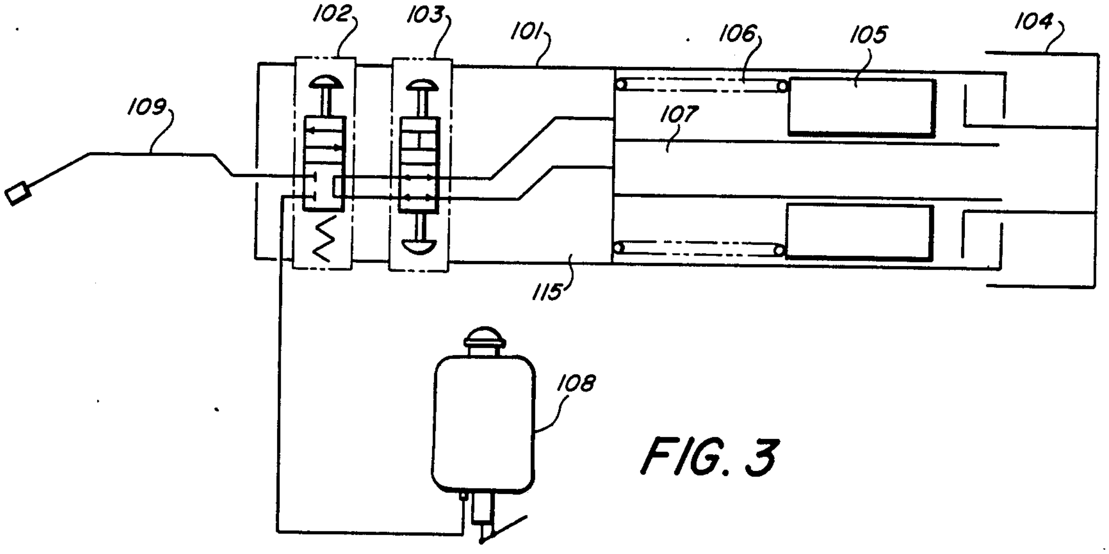
FIG. 3 is a schematic of the spray system utilizing a liquid tank with an integral hand pump pressurizing system.

FIG. 3 of the drawings discloses the spray system utilizing a liquid tank with an integral hand pump pressurizing system. The hand wand dispensing device is designated by reference numeral 101 and consists of the wand body 115, nozzle assembly 109, control valve 102, selector valve 103, stroke adjusting knob 104, piston 105, return spring 106, and feed tube 107. Connected to the control button cartridge using flexible hose is the chemical mix tank with integral hand pump assembly 108.

Figure 4:
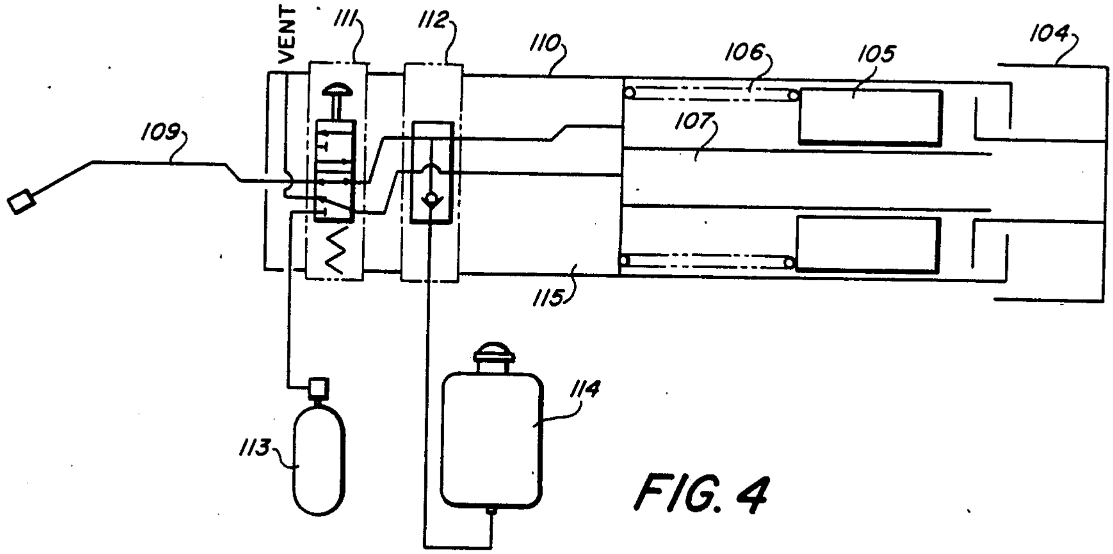
FIG. 4 is a schematic of the spray system utilizing a liquid tank and a separate high pressure air source.

FIG. 4 of the drawing discloses the spray system utilizing a liquid tank and separate high-pressure air source. The hand wand dispensing device is designated by reference numeral 110 and consists of the wand body 115, nozzle assembly 109, stroke adjusting knob 104, piston 105, return spring 106, feed tube 107, control valve 111, and a liquid inlet check valve 112. A high-pressure tank with integral regulator 113 is attached to the control valve, and the chemical mix tank 114 is attached to the inlet check valve. Both are connected using flexible hose.

The spraying system shown in FIG. 3 functions in the following manner: Pressurized liquid from the chemical mix tank with integral hand pump 108 enters the hand wand through a conduit to control valve 102. Depressing the control button on valve 102 diverts the pressurized liquid through a couduit and valve 103 to feed tube 107 to the rear side of piston 105. The fluid pressure forces the piston forward (to the left) and discharges the fluid presently contained in the front side of the piston chamber through selector valve 103 and control valve 102 and then through a conduit to nozzle assembly 109. Releasing the control button allows the valve to return to the position shown. In this position, cavities in front of and behind the piston are connected together to provide pressure release for the rear cavity. Return spring 106 then pushes the piston back to its starting position as shown and, in the process, the forward cavity is filled with the liquid which was previously on the rear side of the piston. The hand wand is now ready for another discharge cycle. The discharge quantity is controlled by adjusting the piston stroke distance with the stroke adjusting knob 104. To switch the wand to a continuous spray mode of operation, push the selector valve 103 to the opposite position. In this configuration, the the wand will spray continuously as long as control valve 102 is pushed.

The spraying system shown in FIG. 4 functions in the following manner. Replace valve 102 with air control valve 111 and the selector valve 103 with inlet check 112. When the control button of control valve 111 is pushed, it allows compressed air from high-pressure tank 113 to travel to the rear side of piston 105, forcing it forward and discharging the liquid from the cavity on the front side of the piston. Releasing the button vents the air through a conduit to valve 111 and to the rear side of the piston, thus allowing the spring 106 to push the piston to its starting position. The piston return stroke draws in another liquid charge through the liquid check valve 112. The hand wand is now ready for another discharge cycle. The discharge quantity is controlled by adjusting the piston stroke distance with the stroke adjusting knob 104.

The present invention has several advantages over prior art devices. For example:

1. The system allows rapid dispensing of chemical shots without operator fatique, allowing application costs to be very competitive with all present systems.
2. The power-activated dispenser allows the use of drift reducing chemical additives which generally thicken the chemical and are difficult to apply by hand pump-type sprayers.
3. The output may be adjusted during operation to treat varying vegetation conditions on a site.
4. The system is environmentally sound because it matches application rates with required prescription.
5. The system not only can spot-treat but can be modified for broadcast or strip treatments.
6. The modular embodiments will adapt to most existing commercial pressure tank systems.

Although the figures depict a specific device and the description describes a specific method for an herbicide application system, they in no means limit the principles of the invention to those illustrated. For example, a compressed gas other than air may be employed to pressurize the system.

What is claimed is:

1. A liquid dispensing device comprising:

a. a body;

b. a chamber within said body;

c. a piston slidably mounted within said chamber to form a front cavity to the front of the piston and a rear cavity to the rear of said piston so that said piston moves in a rearward and a forward direction;

d. a means for biasing said piston in the rearward direction;

e. a nozzle;

f. a combined fluid pressure means and supply of liquid;

g. a first valve and second valve each having an open and a closed position;

h. a first conduit connecting said front cavity to said second valve;

i. a second conduit connecting said rear cavity to said second valve;

j. a third conduit connecting said nozzle to said first valve;

k. a fourth conduit connecting said combined fluid pressure means and supply of liquid to said first valve;

l. a fifth and sixth conduit, each connecting said first valve to said second valve and;

wherein with said first valve in the open position said third conduit is connected to said fifth conduit and said fourth conduit is connected to said sixth conduit, and with said first valve in the closed position said fifth conduit is connected to said sixth conduit; and wherein with said second valve in the open position said first conduit is connected to said fifth conduit and said second conduit is connected to said sixth conduit, and with said second valve in the closed position said fifth conduit is connected to said sixth conduit.

2. A device as described in claim 1 wherein with said first valve in the open position said fifth conduit is disconnected from said sixth conduit and with said first valve in the closed position said third conduit is disconnected from said fifth conduit and said fourth conduit is disconnected from said sixth conduit; and wherein with said second valve in the open position said fifth conduit is disconnected from said sixth conduit.

* * * * *